Patented Mar. 3, 1953

2,630,442

UNITED STATES PATENT OFFICE 2,630,442

ORGANOTIN PHOSPHATE ESTERS

James M. Church, Tenafly, Hugh E. Ramsden, New Brunswick, and Herbert Hirschland, Cranford, N. J., and Harry W. Buchanan, New York, N. Y., assignors to Metal & Thermit Corporation, New York, N. Y., a corporation of New Jersey No Drawing. Application May 21, 1949, Serial No. 94,746

5 Claims. (Cl. 260—429)

This invention relates to new organotin compounds comprising organotin phosphate esters in which the organotin portion is connected to the phosphate group through tin and consists of two to three organic radicals connected to tin, and in which the ester portion connected to the phosphate group consists of one to two organic radicals. It relates further to compositions incorporating the new organotin phosphate esters, such compositions being themselves new and useful and serving to illustrate one of the uses for the new compounds.

In one form, the compounds may be represented generally by the formula:

$$R_1R_2(SnR_3R_4R_5)PO_4$$

in which $R_3$, $R_4$ and $R_5$ are organic radicals selected from the group consisting of alkyl, aryl, aralkyl, heterocyclic and cycloaliphatic radicals, each of which is connected to tin, which in turn is connected to the phosphate group, and in which $R_1$ and $R_2$ are organic radicals selected from the group consisting of alkyl, aryl, aralkyl, heterocyclic and cycloaliphatic radicals, each of which is connected to the phosphate group. Under this definition, a radical connected to an oxygen atom of the phosphate group is to be understood as being "connected to the phosphate group." By "alkyl" and "aryl" it is intended to include substituted as well as unsubstituted alkyl and aryl groups. As is evident, the compounds covered by the above formula belong to the class of simple phosphates. Another class of simple phosphates may be represented generally as: $R_1(SnR_3R_4)PO_4$, in which $R_1$, $R_3$ and $R_4$ have the values and linkages as above. The invention also comprises the more complex polyphosphate esters which may be represented as follows:

$$R_1R_2(SnR_3R_4R_5)_2P_2O_7$$
$$R_1R_2(SnR_3R_4)P_2O_7$$
$$R_1R_2(SnR_3R_4R_5)_3P_3O_{10}$$
$$R_1R_2(SnR_3R_4R_5)(SnR_3R_4)P_3O_{10}$$
$$R_1R_2(SnR_3R_4)_3(P_3O_{10})_2$$

in which $R_1$, $R_2$, $R_3$, $R_4$, and $R_5$ have the same values and linkages as before.

When the $R_1$ and $R_2$ groups in the above formulas are alkyl, it is preferred that they contain at least four, and more preferably six to ten, carbon atoms. When the $R_3$, $R_4$ and $R_5$ groups are alkyl, they may contain up to sixteen carbons, preferably three to six. As alkyl radicals there may be mentioned methyl, ethyl, propyl, butyl, isobutyl, amyl, isoamyl, hexyl, isohexyl, cyclohexyl, octyl, lauryl, etc. Substituted alkyls include alkyl groups substituted by halogen and other groups. For $R_1$ and $R_2$, the alkyl groups may be the same or different, and similarly for $R_3$, $R_4$ and $R_5$, the groups may be the same or different. Within the class of aryl radicals such groups as phenyl, tolyl, xylyl, napthyl, etc. are useful, as are aralkyl radicals like benzyl, phenethyl, and substituted aryls like the halobenzenes, etc.

As specific examples of compounds provided by the invention, there may be mentioned:

Dioctyl, tributyl tin, phosphate, $$(C_8H_{17})_2[Sn(C_4H_9)_3]PO_4$$

Diphenyl, triphenyl tin, phosphate, $$Ph_2(SnPh_3)PO_4$$

Hexyl, dipropyl tin, phosphate, $$C_6H_{13}[Sn(C_3H_7)_2]PO_4$$

Didecyl, di-trihexyl tin, pyrophosphate, $$(C_{10}H_{21})_2[Sn(C_6H_{13})_3]_2P_2O_7$$

Dihexyl, diphenyl tin, pyrophosphate, $$(C_6H_{13})_2(SnPh_2)P_2O_7$$

Dicapryl, tri-tributyl tin, triphosphate, $$(C_8H_{17})_2[Sn(C_4H_9)_3]_3P_3O_{10}$$

Diphenyl, tributyl tin, diamyl tin, triphosphate, $$Ph_2[Sn(C_4H_9)_3][Sn(C_5H_{11})_2]P_3O_{10}$$

Difuryl, tri-tributyl tin, triphosphate, $$(C_4H_3O)_2[Sn(C_4H_9)_3]_3P_3O_{10}$$

All of the above and related compounds are intended to be included within the scope of the invention, and within the classification which may be defined as organotin phosphate esters, in which the inorganic constituents: tin and phosphorous, in combination with various organic radicals, are linked together directly or through oxygen.

The organotin phosphate esters may be made by reacting an organotin compound with an acid phosphate ester, i. e., a phosphate ester containing one or more alkyl, aryl, aralkyl, heterocyclic and cycloaliphatic radicals substituted therein. Examples of such phosphate esters are dioctyl acid phosphate, phenyl dihydrogen phosphate, octyl furyl dihydrogen pyrophosphate, cyclohexyl octyl hydrogen phosphate, dibenzyl dihydrogen pyrophosphate, etc. Organotin compounds include dialkyl tin oxides like dibutyl tin oxide, dipropyl tin oxide, diamyl tin oxide, didecyl tin oxide; diaryl tin oxides like diphenyl tin oxide, ditolyl tin oxide, dixylyl tin oxide, dinaphthyl tin oxide; diaralkyl tin oxides like dibenzyl tin oxide, diphenethyl tin oxide; also difuryl tin oxide, dithienyl tin oxide, dicyclohexyl tin oxide; also trialkyl tin hydroxides like tributyl tin hydroxide, tripropyl tin hydroxide, trihexyl tin hydroxide; triaryl tin hydroxides like triphenyl tin hydroxides; triaralkyl tin hydroxides like tribenzyl tin hydroxides; also trifuryl tin hydroxide, tri-beta-pyridyl tin hydroxide; also dialkyl, diaryl, and diaralkyl tin dihalides, and trialkyl, triaryl, and triaralkyl tin monohalides, such as dibutyl tin dichloride, diamyl tin dichloride, dihexyl tin dichloride, dioctyl tin dichloride, didecyl tin dichloride, diphenyl tin dichloride, dibenzyl tin dichloride, tributyl tin chloride, triphenyl tin chloride, tribenzyl tin chloride; also dicyclohexyl tin dichloride, difuryl tin dichloride, tri-beta-pyridyl tin bromide, tri-beta-quinolyl tin bromide, trimethylcyclohexyl tin bromide, etc.

In the case of the organotin halides, the reaction may also be performed by using an alkali salt of the acid phosphate ester. This is the preferred method for preparing the organotin phosphate esters. As examples of such salts, there may be mentioned disodium butyl phosphate, mono potassium dicapryl phosphate, sodium trihexyl pyrophosphate, etc. The reaction may be carried out by bringing together the organotin halide and the alkali salt of the acid phosphate ester in any generally suitable proportions, although for practical reasons a large excess of one reactant is to be avoided. Satisfactory results may be obtained by using stoichiometrical quantities of the reactants. It is preferable to conduct the reaction at temperatures ranging from about 50 to about 150° C. If a solvent is used, as is desirable, it is advantageous to run the reaction at the boiling point of the solvent, keeping within the above temperature range. Solvents like alcohol, alcohol-water, ether, hexane, heptane, carbon tetrachloride, toluene, etc. are suitable. The reaction may also proceed at room temperatures, although at a reduced rate. At higher temperatures, the reaction may require up to one or two hours for substantial completion. The pressure during the reaction is atmospheric, although it is possible to carry it out under higher or lower pressures.

When the organotin compound is reacted with an acid phosphate ester, the reaction conditions may be substantially as just described, although in this case a longer time may be required.

Alternatively, the organotin phosphate esters may be made by reacting an organotin compound of the kind described with a phosphoric acid or a derivative of the same and with an esterifying agent. All three of these reactants may be brought together at the same time and reacted, or else the first two may be reacted separately and the product thereof subsequently esterified. Reaction conditions substantially as just described will prevail. As phosphoric acids, there may be mentioned the ortho-, pyro-, meta-, and poly- acids; and as derivatives of phosphoric acids the following are useful: phosphorus pentoxide, phosphorus oxychlorides, phosphorus pentachloride. Esterifying agents or reactants include straight and branched chain and cyclic alcohols and olefins, and alkyl, aryl and aralkyl halides, suitably chosen to provide alkyl, aryl, or aralkyl radicals of the kind described above in connection with the alkali salts of the acid phosphate esters.

Examples 1 to 3 may illustrate the preparation of several compounds by various methods. The compound underlined at the beginning of each example is the product of the method described therein.

EXAMPLE 1

*Dioctyl, tributyl tin, phosphate*

Approximately 26 g. of octyl alcohol (0.2M) is added to 15 g. (0.1M) of phosphorus oxychloride dissolved in 100 cc. benzene and the mixture refluxed at 80–85° C. for one hour during which time hydrogen chloride is evolved. The hot reaction mixture is blown with air to rid it of the residual hydrogen chloride and a 10% sodium hydroxide solution added until the aqueous portion of the reaction mixture tests neutral to litmus. To the aqueous solvent reaction mixture is added 33 g. (0.1M) of tributyl tin monochloride dissolved in 100 cc. of benzene. The mixture is heated to a gentle reflux for 6 to 10 hours for completion of the reaction as evidenced by the formation of a strong salt solution as the lower layer. The salt layer is separated and the upper oil layer washed several times with water. Finally the washed oil layer is stripped free of solvent by distillation leaving a light straw yellow viscous oily residue, which may be distilled in vacuo to produce a practically water white distillate.

EXAMPLE 2

*Dicapryl, tri-tributyl tin, triphosphate*

Fifty-five grams of trisodium dicapryltriphosphate (0.1M) is dissolved in 100 cc. water and 100 cc. ethyl alcohol. To this solution is added 98 g. of tributyl tin monochloride (0.3M) dissolved in 100 cc. ethyl alcohol. The combined mixture is heated gently for 10–12 hours and finally quenched with water and the oil layer extracted with toluene. Upon removal of toluene from the separated organic layer, a very light yellow viscous oily liquid is obtained.

EXAMPLE 3

*Dihexyl, diphenyl tin, pyrophosphate*

A mixture of 41 g. hexyl alcohol (0.4M) and 28 g. phosphorus pentoxide (0.2M) are gently heated together. To the resulting mass is slowly added dilute sodium hydroxide until the solution tests neutral to litmus. A separate solution containing 68 g. diphenyl tin dichloride (0.2M) dissolved in 100 cc. of toluene is prepared and added to the above stirred phosphate solution, and the resulting mixture heated to a gentle reflux for 3 to 4 hours. The lower aqueous layer is decanted and the upper product layer washed several times with warm water. Upon removal of the toluene by distillation under vacuo, a thick light yellow viscous oily liquid is obtained.

The organotin phosphate esters are suitable for use as stabilizers for organic materials containing chlorine or other halogen, such as vinyl resins which contain a polymerized vinyl halide, chlorinated paraffins containing from 10 to 40 carbon atoms per molecule, chlorinated stearates, chlorinated biphenyls, DDT, chlorinated rubber, and other preferably high molecular weight halogenated materials. As is known, such materials are inherently unstable even under ordinary conditions of normal temperatures, humidities, and the presence of traces of contaminating agents. At the higher temperatures of processing or application their inherent instability is greatly aggravated, resulting in considerable decomposition of the materials and making them more susceptible to attack by chemical agents, such as oxygen of the air. Consequently the properties of these halogenated substances are greatly changed by deterioration and they suffer considerable loss of mechanical strength, solvent characteristics, fluid properties, resistance to aging, and other critical properties. Because of their instability, they are readily discolored upon exposure to light or heat, rendering them useless for the purpose for which they were intended. By adding from about 0.1 to about 10% of an organotin phosphate ester to the material to be stabilized, a composition is obtained which is greatly improved in stability by comparison with the unstabilized material. The following examples may illustrate the procedure for preparing such compositions.

EXAMPLE 4

To a resinous composition containing 62 parts by weight of a polyvinyl resin consisting of 87% vinyl chloride and 13% vinyl acetate, 35 parts of dioctyl phthalate as the plasticizer, add 3 parts of dioctyl, tributyl tin, phosphate as stabilizer. This mixture may be compounded by mixing and fluxing for a few minutes while hot on a differential speed roll mill at 150 to 160° C. and then removed from the mill as a plastic sheet. The composition is then ready to be molded.

EXAMPLE 5

To another resinous composition containing 60 parts of vinyl resin (87% vinyl chloride and 13% vinyl acetate) and 38 parts of dihexyl sebacate as the plasticizer, add 2 parts of dicapryl, tri-tributyl tin, triphosphate as stabilizer and compound as in the preceding example.

EXAMPLE 6

In this case a chlorinated paraffin may be stabilized. Add 4 parts of didecyl, di-trihexyl tin, pyrophosphate to 96 parts of a chlorinated paraffin (42% chlorine) and mix in any desired manner.

The foregoing compositions may include additional ingredients such as pigments and fillers of the inorganic or organic type, solvents of a great variety, dyestuffs, etc. The stabilizing effect of the organotin phosphate esters is not limited to plasticized or solution mixtures as they are effective by merely bringing the stabilizer into contact with the halogenated compound, regardless of their compatibility with other components of the mixtures.

Although the invention has been described in connection with more or less specific embodiments, it will be understood that it is capable of obvious variations without departing from its scope.

In the light of the foregoing description, the following is claimed:

1. An organotin phosphate ester consisting of at least one organotin portion connected to the phosphate group through tin, said portion consisting of two to three alkyl radicals connected to tin, each alkyl having up to 16 carbon atoms per radical, each said tin atom being connected to the phosphate group through at least one oxygen atom of said group, said ester portion being connected to the phosphate group and consisting of one to two alkyl radicals having at least 4 carbon atoms, each said alkyl radical of the ester portion being connected to an oxygen atom of the phosphate group.

2. An organotin phosphate ester consisting of at least one organotin portion connected to the phosphate group through tin, said portion consisting of two to three alkyl radicals connected to tin, each alkyl having 3 to 6 carbon atoms per radical, each said tin atom being connected to the phosphate group through at least one oxygen atom of said group, said ester portion being connected to the phosphate group and consisting of one to two alkyl radicals having from 6 to 10 carbon atoms, each said alkyl radical of the ester portion being connected to an oxygen atom of the phosphate group.

3. An organotin phosphate ester consisting of at least one organotin portion connected to the phosphate group through tin, said portion consisting of two to three alkyl radicals connected to tin, each alkyl having up to 16 carbon atoms per radical, each said tin atom being connected to the phosphate group through at least one oxygen atom of said group, said ester portion being connected to the phosphate group and consisting of one to two aryl radicals, each said aryl radical of the ester portion being connected to an oxygen atom of the phosphate group.

4. An organotin phosphate ester consisting of at least one organotin portion connected to the phosphate group through tin, said portion consisting of two to three organic radicals connected to tin with said organic radicals being selected from the class consisting of alkyl and aryl radicals, said alkyl radicals having up to 16 carbon atoms per radical, each said tin atom being connected to the phosphate group through at least one oxygen atom of said group, said ester portion being connected to the phosphate group and consisting of one to two organic radicals selected from the class consisting of alkyl and aryl radicals, said last mentioned alkyl radicals having at least 4 carbon atoms per radical, and each said organic radical of said ester portion being connected to the phosphate group through at least one oxygen atom of said group.

5. An organotin phosphate ester consisting of at least one organotin portion connected to the phosphate group through tin, said portion consisting of two to three alkyl radicals connected to tin, each alkyl having up to 16 carbon atoms per radical, each said tin atom being connected to the phosphate group through at least one oxygen atom of said group, said ester portion being connected to the phosphate group and consisting of one to two organic radicals selected from the class consisting of alkyl and aryl radicals, said last mentioned alkyl radicals having at least 4 carbon atoms per radical, and each said organic radical of said ester portion being connected to the phosphate group through at least one oxygen atom of said group.

JAMES M. CHURCH.
HUGH E. RAMSDEN.
HERBERT HIRSCHLAND.
HARRY W. BUCHANAN.

REFERENCES CITED

The following references are of record in the file of this patent:

UNITED STATES PATENTS

| Number | Name | Date |
| --- | --- | --- |
| 1,573,738 | Oechslin | Feb. 16, 1926 |
| 2,161,026 | Doolittle | June 6, 1939 |
| 2,224,695 | Prutton | Dec. 10, 1940 |
| 2,267,777 | Yngve | Dec. 30, 1941 |
| 2,344,002 | Rugeley et al. | Mar. 14, 1944 |
| 2,416,985 | Farrington et al. | Mar. 4, 1947 |
| 2,431,038 | Harris | Nov. 18, 1947 |
| 2,456,692 | Farkas et al. | Dec. 21, 1948 |

OTHER REFERENCES

Krause et al., "Die Chemie der Metall, Organischen Verbindugen," pages 329, 330, (1943), Edwards Brothers, Inc., Ann Arbor, Michigan.